United States Patent [19]
Mestdagh et al.

[11] Patent Number: 5,331,316
[45] Date of Patent: Jul. 19, 1994

[54] COMMUNICATION SYSTEM INCLUDING ALLOCATING FREE SIGNALLING CHANNELS TO INDIVIDUAL SUBSTATIONS HAVING DATA TO TRANSMIT

[75] Inventors: Denis J. G. Mestdagh, Brussels; Robertus J. Van Engelshoven, St. Antonius Zoersel; Bart J. G. Pauwels, Borgerhout, all of Belgium

[73] Assignee: Alcatel N.V., Amsterdam, Netherlands

[21] Appl. No.: 613,512

[22] PCT Filed: Jun. 23, 1989

[86] PCT No.: PCT/EP89/00728
§ 371 Date: May 6, 1991
§ 102(e) Date: May 6, 1991

[87] PCT Pub. No.: WO91/00662
PCT Pub. Date: Jan. 10, 1991

[51] Int. Cl.$^5$ .................. H04L 12/28; H04L 12/40
[52] U.S. Cl. .................. 340/825.03; 340/825.04; 340/825.5; 370/95.1; 370/95.3; 370/85.6; 370/85.7; 370/85.9
[58] Field of Search .................. 340/825.03, 825.05, 340/825.04, 825.5; 370/95.1, 95.3, 85.12, 85.7, 85.6, 85.9

[56] References Cited
U.S. PATENT DOCUMENTS

| | | | |
|---|---|---|---|
| 3,639,904 | 2/1972 | Arvlpragasam | 370/85.7 |
| 4,554,656 | 11/1985 | Budrikis et al. | 370/85.7 |
| 4,718,061 | 1/1988 | Turner | 370/85.7 |
| 4,891,804 | 1/1990 | Lake | 370/95.1 |

FOREIGN PATENT DOCUMENTS
WO8603639 6/1986 PCT Int'l Appl. .

OTHER PUBLICATIONS
R. M. Newman, et al., *IEEE Communications Magazine*, "The QPSX Man", Apr. 1988, vol. 26, No. 4, pp. 20–28.
T. Israel, et al., *Electrical Communication*, "System 12. Configuration for ISDN Subscriber Equipment Network Termination Digital Telephones, and Terminal Adapters", vol. 59, No. ½, 1985, pp. 120–126.
Bell System Technical Journal, vol. XLIII, Sep. 1964, No. 5, Part 1, pp. 1869–1870.
W. M. Hubbard, "Fiberguide Integrated Services Multiple Access Network", ISSLS 1984, Nice, Oct. 1–5, 1984, pp. 153–156.

*Primary Examiner*—Michael Horabik
*Attorney, Agent, or Firm*—Robbins, Berliner & Carson

[57] ABSTRACT

A communication system includes a main station (MS) and a plurality of substations (SX/SZ) which include each a transceiver and are all connected in parallel to first (UL) and second (DL) unidirectional links on which recurrent first and second cells of fixed length are transmitted in opposite direction. Each of these cells contains a plurality of signalling channels smaller than the number of substations. When a substation has to transmit data it starts an allocation procedure wherein the substation cooperates with the main station and by which a channel is allocated to it. Afterwards prior to transmitting the data the substation transmits a request signal in the allocated channel and starts transmission after having received from the main station a grant signal in the homologous signalling channel of a second cell. De-allocation of a channel occurs as soon as the latter is no longer needed.

23 Claims, 4 Drawing Sheets

COMMUNICATION SYSTEM INCLUDING ALLOCATING FREE SIGNALLING CHANNELS TO INDIVIDUAL SUBSTATIONS HAVING DATA TO TRANSMIT

TECHNICAL FIELD

The present invention relates to a communication system with a plurality of substations intercoupled by first and second paths on which recurrent first and second cells each including a signalling channel and a data field, are conveyed in opposite directions, each substation including a transmitter to write information in first cells each including a plurality of signalling channels and a receiver to read information from second cells.

BACKGROUND ART

Such a communication system is already known from the article "The QPSX Man" by R. M. Newman et al, published in IEEE Communications Magazine. April 1988, Vol. 26, No. 4, pp. 20-28. In this known system the signalling channels of each first cell are allocated to respective ones of a like number of priorities and each substation having data of a certain priority to be transmitted is able to write a data transmission request signal in the signalling channel allocated to this priority of a first cell. But since there is only a single such signalling channel per cell conflicts could occur and to avoid this each substation includes an additional receiver to assess the busy/free state of the concerned signalling channel of a received first cell before possibly writing a transmission request signal therein. Further, each substation is provided with means including an additional transmitter to monitor the use of the data channels of the second cells as a function of the request signals received in the signalling channels of the first cells. Both the additional receiver and the additional transmitter and the circuitry associated therewith have for effect that each substation is of relatively complex structure and therefore relatively expensive.

It should be noted that if the above known system processes data of a same priority the first cells only include a single signalling channel for transmitting request signals so that also in this case conflicts between the stations can occur and additional transmitters and receivers have to be provided.

DISCLOSURE OF THE INVENTION

Accordingly, an object of the present invention is to provide a less complex communication system of the above type, particularly by the avoidance of such additional receiver and transmitter in each substation.

According to the invention this object is achieved due to the fact that it includes a main station with another receiver to read information from said first cells and with another transmitter to write information into said second cells, each of said first and second cells including a plurality of signalling channels smaller than the number of substations, means in said main station and substations to allocate to each substation having to transmit data any free one of said plurality of channels, means in each substation having a signalling channel allocated to it to transmit to said main station a request signal for data transmission in this signalling channel of a first cell, and means in said main station which in response to the receipt of said transmission request signal, transmit to the requesting substation a data transmission grant signal in a signalling channel of a second cell.

Because a signalling channel of a first cell is allocated to a substation having to transmit data no conflicts for the use of this channel can occur so that no additional receiver is required in the substation. On the other hand, the data channel monitoring function is now performed in the main station only so that also no additional receiver is required in the substations.

One could have provided a number of signalling channels equal to the number of substations but this would have led to the use of too much signalling bandwidth per cell. By using a number of signalling channels in function of the traffic, i.e. in function of the number of substations which have to transmit data simultaneously, the signalling bandwidth may be maintained within acceptable limits.

It should be noted that the article "System 12. Configuration for ISDN Subscriber Equipment Network Termination Digital Telephones, and Terminal Adapters" by T. Israel et al, Electrical Communication, Vol. 59, No ½, 1985, pp. 120-126 already discloses a communication system with a plurality of substations and a main station intercoupled by first and second paths used to convey information in opposite directions and using a signalling channel to request for the use of a data channel. However, also in this known system there is only one signalling channel (the D-channel) and the main station allocates a data channel to a substation for the duration of a communication. In other words this known communication system operates only in the circuit switched mode and not in the packet or cell switched mode whereas the present system, like that disclosed by the first above mentioned article, is not restricted to one or the other mode.

Another characteristic feature of the present communication system is that said first and second cells each include a same number of signalling channels and that the signalling channel of said second cell corresponding to the allocated signaling channel of said first cell is used by said main station to transmit said grant signal.

By allocating corresponding signalling channels in the first and second cells to a same substation no additional allocation means are required for the signalling channels of the second cells.

Still another characteristic feature of the present communication system is that each of said substations includes de-allocation means to de-allocate a previously allocated signalling channel when a second predetermined time interval has elapsed since the last receipt of new data to be transmitted.

In this way the number of signalling channels is allowed to be much smaller than the number of substations.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

To be noted that in the drawings the connections are represented by single wires although they may be constituted by a plurality of such wires.

BEST MODE FOR CARRYING OUT THE INVENTION

Figure 1:
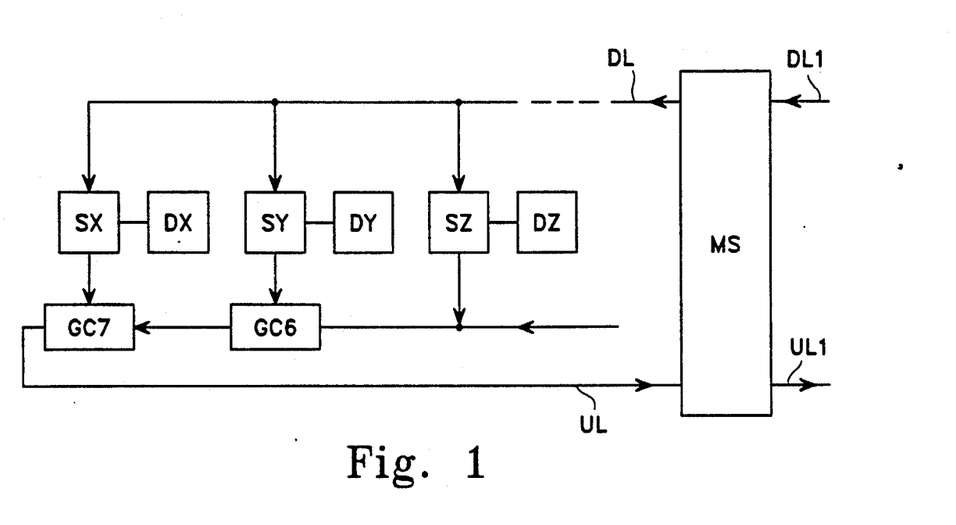
FIG. 1 schematically represents a communication system according to the invention.

As shown in FIG. 1 the present communication system includes a main station MS connected to a folded unidirectional incoming upstream link UL as well as to a unidirectional outgoing downstream link DL and a plurality of eight or more substations of which only SX, SY and SZ are shown. These substations are coupled in parallel (via gating circuit GC6 for SY and gating circuit GC7 for SX) between the links UL and DL and each of them has an associated data register, such as DX, DY and DZ. The main station MS is further for instance coupled to a switching exchange (not shown) via links UL1 and DL1.

The main station MS and the substations each include a transmitter/receiver and are able to exchange information under the form of information packets of a fixed length, called cells. These on UL are called first cells, and those on DL are called second cells. Each of these cells such as the one represented in FIG. 5, comprises a 4-byte header H and a 32-byte information field IF and each header includes a so-called MAC (Media Access Control) field or byte MF and a VCI (Virtual Channel Identifier) constituted by a two bytes and identifying the virtual channel on which the cell is transmitted. As will become clear later each of the 8 bits of the field MF constitutes a signalling channel between MS and 8 of the substations, whilst the information field IF of the cell is either empty or contains data, signalling channel status information or an address in which case it is a data cell, a check cell or an echo cell respectively.

The main station MS (FIG. 2) includes a clock recovery circuit CLR1 which is connected to the incoming downstream link DL1 and derives from a cell stream received thereon a cell clock signal CCL1, a word or byte clock signal WCL1 and a bit clock signal BCL1. These clock signals control the various circuits of the main station MS in a way which is not shown but which will become clear from the description of the operation of the station. The bit clock signal BCL1 defines a bitframe having a bitrate of 150 Megabit/sec, and the cell clock signal CCL1 defines a cell frame having a cell rate which is 36×8 times smaller than the bitrate since each cell comprises 36×8 bits. The main station MS also includes another clock recovery circuit CLR2 which is connected to the incoming upstream link UL and derives from a cell stream received thereon a cell clock signal CCL2, a word or byte clock signal WCL2 and a bit clock signal BCL2. This cell stream is entered into the cell buffer BUF under the control of these clock signals and read therefrom under the control of the clock signals CCL1, WCL1 and BCL1 provided by the clock recovery circuit CLR1. In this way the whole main station operates synchronously under the control of the clock signals provided by CLR1.

Each of the substations, such as SZ (FIG. 3), includes a clock recovery circuit CLR3 which is connected to the incoming down stream link DL and derives from an incoming cell stream on this link a bit clock signal BCL3, a byte or word clock signal WCL3 and a cell clock signal CC13. The clock signals BCL3 and CCL3 define a bitframe and a cell frame respectively and together with the word clock signal WCL3 they control the various circuits of the substation SZ in a way which is not shown but which will become clear from the description of the operation of this station.

Before describing the structure and the operation of the system in relative detail, a brief description of this operation is given below.

The 8 bit positions of the MAC or signalling field MF of each cell are used as signalling channels and each of them may be allocated to any of the substations so that a maximum of 8 of these substations may simultaneously have signalling channels assigned to them.

The main station MS stores the general allocation status of all the signalling channels in a register ASR and when it has time to do so it transmits this allocation status to all the substations in the MAC field of a cell. This allocation status is stored in a register ALR of each substation. In response to such a cell each substation having seized a signalling channel, during an allocation procedure, or having a signalling channel allocated to it transmits to the main station a check cell whose information field contains the single or own allocation status stored in a register MBY, i.e. at least one byte of which the bit corresponding to the signalling channel seized or allocated is on 1. Thus the main station is informed of the individual allocation states of the various substations and thus can update the general allocation states stored in ASR.

When a substation is in the active state, i.e. when a signalling channel has been allocated to it during an allocation procedure, and has to transmit a data cell in the direction of the main station, it puts a transmission request bit 1 in the assigned signalling channel of the MAC field of a cell and transmits this cell on the upstream link to the main station. The latter may then allow the requested transmission by putting a grant bit in the assigned signalling channel of a cell which is then transmitted to all the substations. This grant bit will be recognized by the requesting substation which may then transmit the data cell on the upstream link.

When a substation is in the passive state, i.e. has no signalling channel allocated to it, and has a data cell to be transmitted to the main station it starts an allocation procedure which comprises the following two steps:

during a first step the substation selects a free signalling channel, indicated by a bit 0 in the general allocation status stored in its register ALR, by putting a single corresponding bit on 1 in its own allocation status register MBY. It then requests the main station MS to allocate the thus seized signalling channel by putting a corresponding allocation request bit 1 in the MAC field of a cell and by transmitting this cell to the main station on the upstream link. The latter station may then allocate the signalling channel by putting a grant bit 1 in the corresponding signalling channel of the MAC field of a cell and by then transmitting the cell on the downstream link to all the substations where it will be recognized by the requesting substation. However, since the main station does not know the identity of the requesting substations and because two or more substations may have seized a same free channel the main station could allocate a same signalling channel to these stations and thus give rise to collision. This may be avoided by the execution of a second step which consists in the transmission by each allocation requesting substation of an echo cell containing the own address or identity of the substation. Upon receipt in the main station on the upstream link this echo cell is looped back on the downstream link to all the substations as a return echo cell. If everything is normal, i.e. if only a single substation has sent an echo cell, the own address in the return echo cell will be recognized by this substation. Thus the signalling channel is definitively allocated to the substation as a consequence of which this station is brought in the active state. However, if two or more stations have performed an allocation request simultaneously for the same signalling channel the addresses in the echo cells will corrupt one another so that the corrupted address contained in the echo cell which is received in the main station and in the return echo cell looped back by this station will not be recognized by the requesting substations. The latter will then again try to seize a free signalling channel and this process will continue until only one of them is successful.

Figure 2:
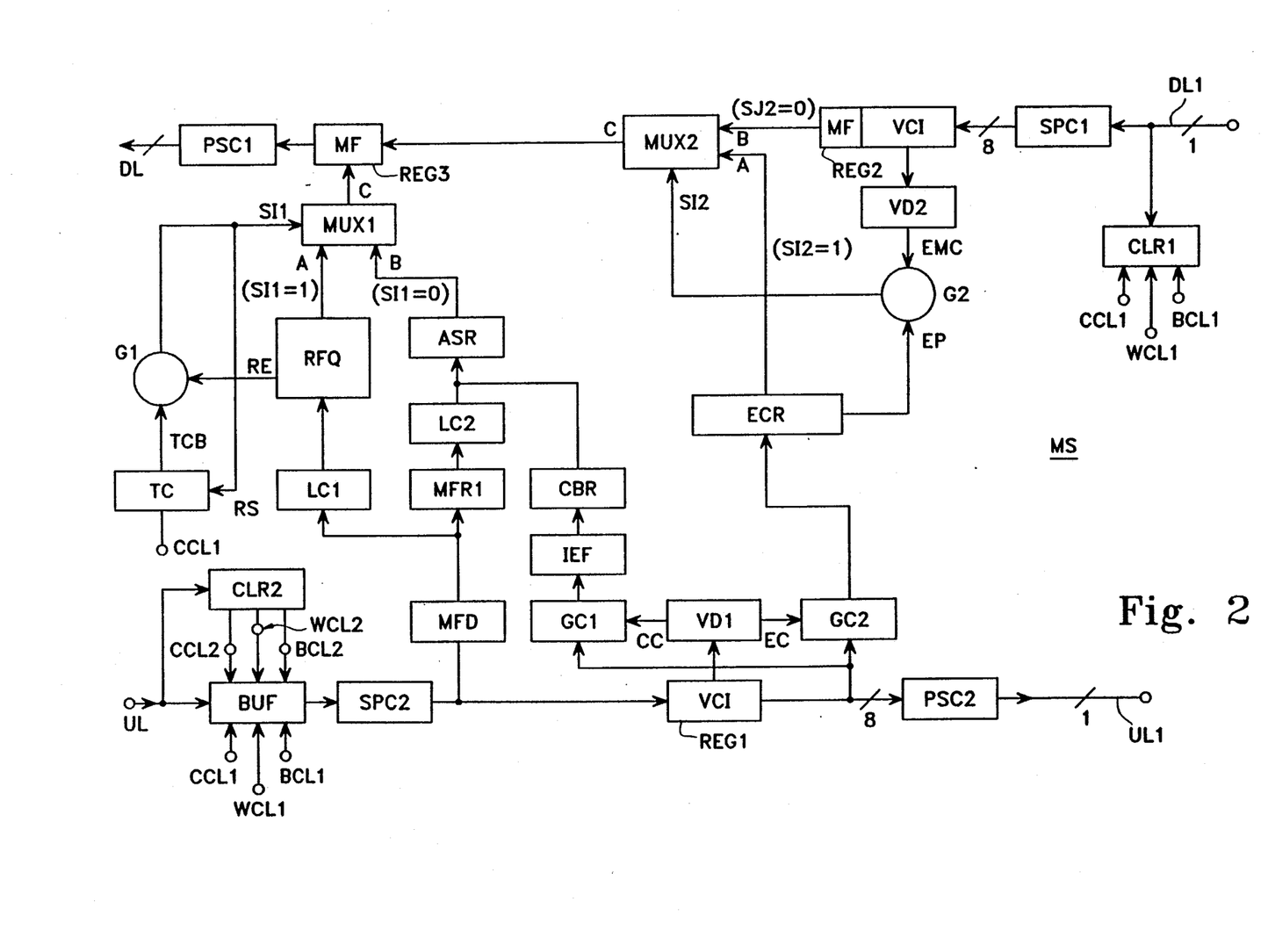
FIGS. 2 and 3 show the main station MS and the substation SZ of FIG. 1 in more detail respectively.
Figure 3:
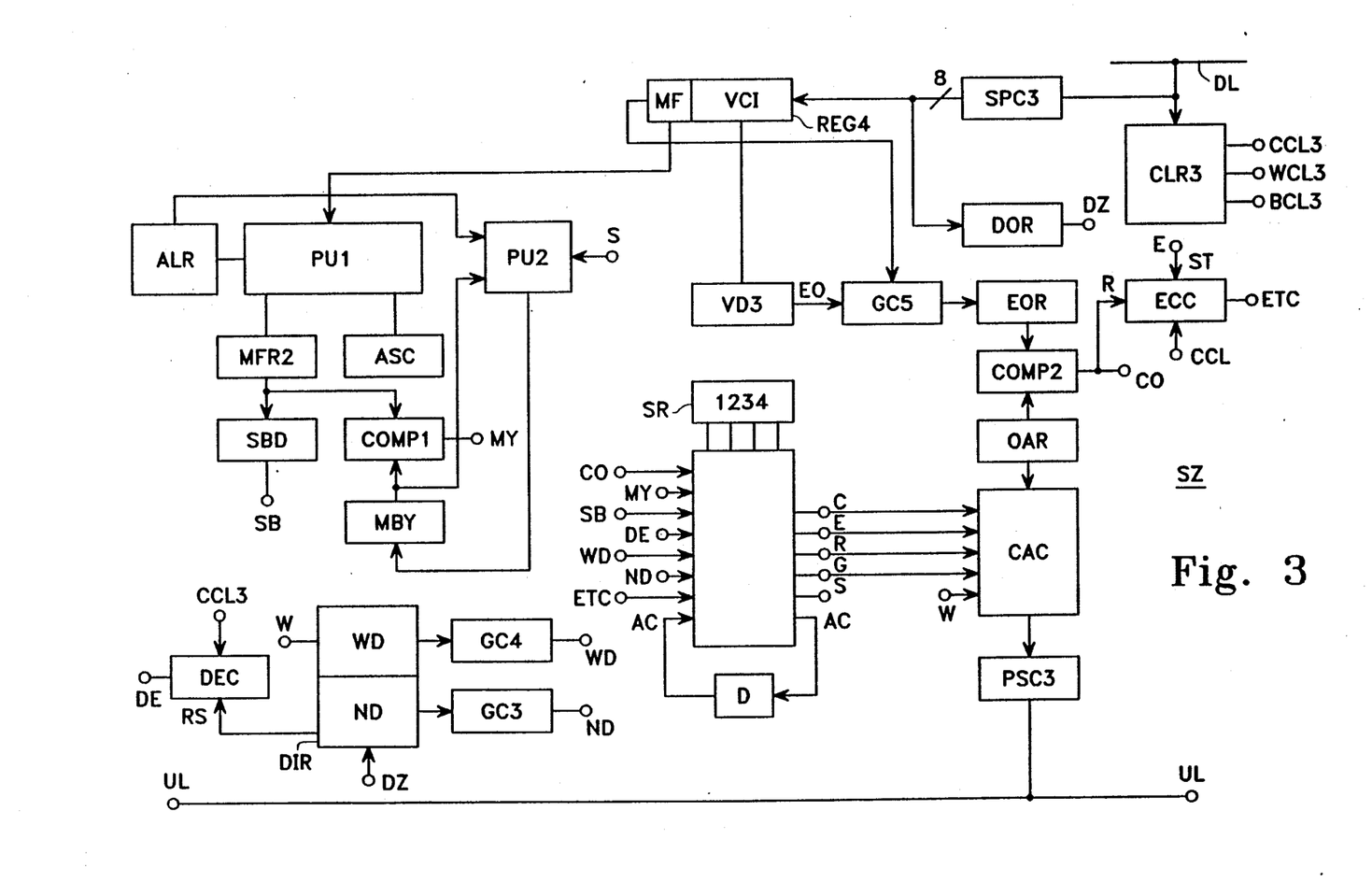

The structure of the main station MS and of the substation SZ are now considered in detail by making reference to FIGS. 2 and 3 respectively.

Figure 5:
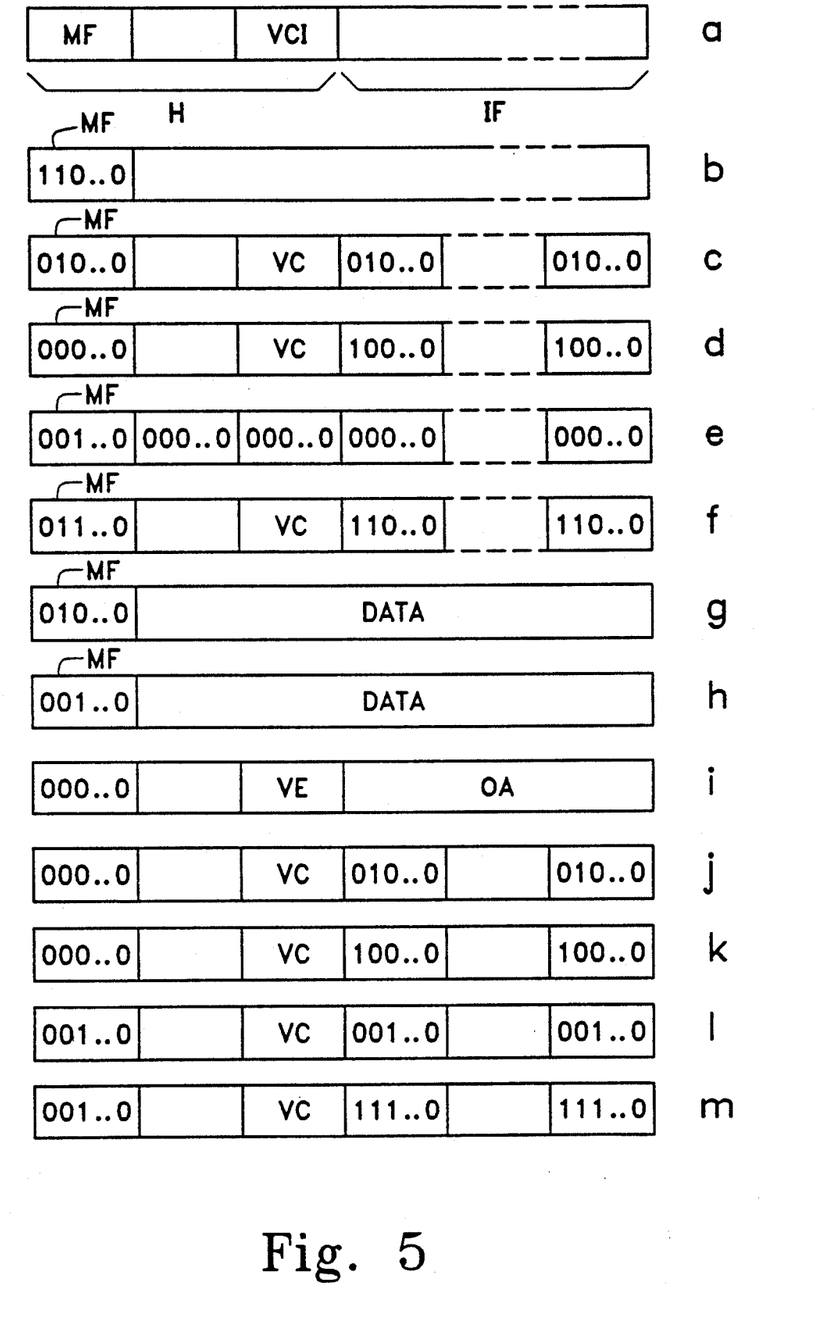
FIGS. 5, a to m represent various communication cells used in the system of FIG. 1.

The main station MS shown in FIG. 2 comprises a transmitter/receiver including the following circuits which are interconnected as shown:

the above clock recovery circuits CLR1 and CLR2 and cell buffer BUF;

registers REG1, REG2 and REG3;

a general allocation status register ASR to store the allocation status of the 8 signalling channels;

a first-in-first-out register REQ to store the MAC fields MF of successive incoming cells and providing an activated/de-activated request output signal RE when the register is not/empty empty respectively;

an echo cell register ECR able to store an echo cell which is of the type shown in FIG. 5i, and to then activate its output EP;

a check byte register CBR to store a byte of the information field of a so-called check cell, which is of the type shown in FIG. 5f;

a MAC field register MFR1 to store the MAC field MF of an incoming cell;

a MAC field detection circuit MFD to detect the MAC field MF of an incoming cell;

a VCI detection circuit VD1 able to detect the VCI field of an echo cell and of a check cell and to then activate its corresponding output EC and CC respectively;

a VCI detection circuit VD2 able to detect the VCI of an empty cell and to then activate its output EMC;

an information field filter circuit IFF to derive from the information field IF of a check cell a single byte;

multiplexers MUX1 and MUX2 each having two data inputs A and B, a data output C and a respective selection input SI1, SI2 which when activated/de-activated connects the input A/B to the output C respectively;

parallel-to-series converters PSC1 and PSC2;

series-to-parallel inverters SPC1 and SPC2;

a timing circuit TC which is controlled by the cell clock signal CCL1 and provides a de-activated output signal TCB when it has counted a predetermined number of cell frames;

logic circuits LC1 and LC2;
gating circuits GC1 and GC2;
AND-gates G1 and G2.

Figure 4:
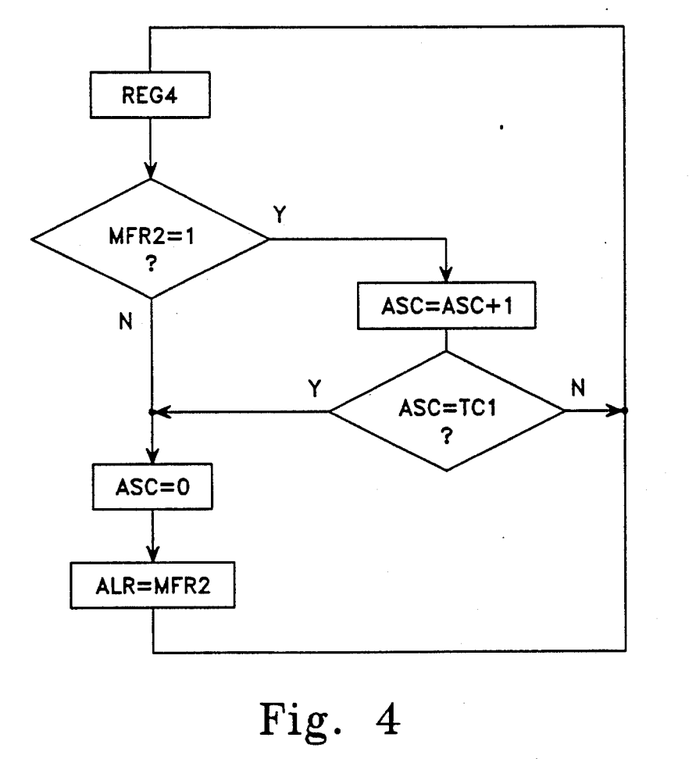
FIG. 4 is a flow chart representing the operation of the processing unit PU1 forming part of the substation SZ of FIG. 3.

The substations all have a similar structure and therefore only one of them, i.e. SZ, is represented in detail in FIG. 3. It includes the following circuits which are interconnected as shown:

the above clock recovery circuit CLR3;

a register REG4;

an 8-bit general allocation status register ALR to store the general allocation status of all 8 signalling channels;

a MAC field register MFR2;

a "my-byte" register MBY storing an 8-bit word of which a single bit 1 indicates the signalling channel, among 8 possible such channels, which has been seized' by or allocated to the substation. This register thus stores the own allocation status of the substation;

a data cell first-in-first-out register DIR to store data cells received from the associated data register DZ (FIG. 1) and to be transmitted to the main station MS. It comprises a first part ND to store the "new" cells i.e. those for which no transmission request has yet been formulated and a second part WD to store the "waiting" cells i.e. those for which such a request has already been transmitted to the main station and which are awaiting a grant signal;

a data cell output register DOR to store the cell received from the main station MS and to be transmitted to the data register DZ or to be eliminated;

an echo cell output register EOR to store the information field IF of an echo cell received from the main station MS;

a status register SR to store the passive and active states of the substation SZ. These are the following:

state 1: the pure passive state;

state 2: the passive allocation state wherein it awaits the receipt of a grant signal before transmitting an echo cell;

state 3: the passive allocation state wherein it awaits the receipt of a return echo cell;

state 4: the active state wherein it may request for the transmission of data cells stored in the data cell input register DIR.

an own address register OAR to store the own address OA or identity of the substation;

an allocation status counter ASC to count the consecutive cells, received in the register REG4, for which the MAC field contains the same single bit 1;

a de-allocation counter DEC to count the time lapsed since the receipt of a new data cell in the data cell input register DIR. It provides an activated/de-activated output signal DE when a predetermined time has elapsed/not elapsed respectively;

a counter ECC to check if a return echo cell is received within a predetermined time interval elapsed since the transmission of an echo cell. It provides an activated/de-activated output signal ETC when this predetermined time interval has elapsed/not elapsed respectively;

a VCI detection circuit VD3 to detect the VCI of an echo cell and to then activate its output EO;

a single bit detection circuit SBD to detect if the allocation status stored in the register MFR2 contains a single bit 1 or more bits 1;

a comparator COMP1 to compare the contents of the registers MFR2 and MBY and to provide an activated/de-activated output signal MY when both these contents are equal/different respectively;

a comparator COMP2 to compare the contents of the registers EOR and OAR and to provide an activated/de-activated output signal CO when both these contents are equal/different respectively;

gating circuits GC3, GC4, and GC5. The gating circuit GC3 is used to detect the presence of at least one new cell in the part ND of the data input register DIR, whilst likewise the gating circuit GC4 is used to detect the presence of at least one waiting cell in the part WD of this register DIR.

a series-to-parallel converter SPC3;

a parallel-to-series converter PSC3;

a processing unit PU1 which is connected to the registers ALR and MF and to the counter ASC and which operates according to the flow diagram shown in FIG. 4;

a processing unit PU2 which is connected to the registers ALR and MBY and which is controlled by the selection output S of FSM. The output MBY of PU2 is connected to the register MBY;

a cell assembly circuit CAC;

a delay circuit D;

a finite state machine FSM which has inputs AC, DE, SB, MY, ND, WD, CO and ETC and outputs G (grant), C (check), E (echo), R (request), S (selection) and AC (active), the latter output being fed back to the like named input AC via the delay circuit D. The finite state machine FSM is also connected to the status register SR and its operation may be represented by the following truth table T1 for the passive states 1 to 3 (for which AC=0) and by the following truth table T2 for the active state 4 (for which AC=1). In these tables the old and new states of FSM are represented by SRO and SRN respectively It is further assumed that at the start of the operation to be described the substations SX and SY are both in the active state, for which AC=1 and SRO=0 in table T2, whereas substation SZ is in the passive state 1 for which AC=0 and SRO=1 in table T1. The registers MBY and DIR of the substations SX, SY and SZ are further supposed to be in the following conditions:

Substation SX

MBY: the own allocation status stored in this register is

010...0 indicating, because also AC=1 as SRO=4, that the second signalling channel has previously been assigned to SX;

DIR: this register includes at least one new data cell and no waiting data cell, so that the output signals of the gates GC3 and GC4 are activated (ND=1) and de-activated (WD=0) respectively. For this reason SX will start a data transmission procedure.

Substation SY

MBY: the own allocation status stored in this register is

100...0 indicating, because also AC=1 and SRO=4, that the first signalling channel has previously been assigned to SY;

DIR: this register includes no new data cells and no waiting data cells so that the output signals of the gates GC3 and GC4 are both de-activated, i.e. ND=0 and WD=0 respectively. For this reason SY

| Input Signals | | | | | | | | | Output Signals | |
|---|---|---|---|---|---|---|---|---|---|---|
| AC | DE | SB | MY | ND | WD | CO | ETC | SRO | SRN | |
| | | | | | T1 | | | | | |
| 0 | X | X | X | 0 | 0 | X | X | 1 | 1 | — |
| 0 | X | X | X | 1 | 0 | X | X | 1 | 2 | S,R |
| 0 | X | 0 | 0 | X | X | X | X | 2 | 2 | — |
| 0 | X | 0 | 1 | X | X | X | X | 2 | 2 | — |
| 0 | X | 1 | 0 | X | X | X | X | 2 | 2 | — |
| 0 | X | 1 | 1 | X | X | X | X | 2 | 3 | E |
| 0 | X | 0 | 0 | X | X | X | X | 3 | 1 | — |
| 0 | X | 0 | 1 | X | X | 0 | X | 3 | 3 | C |
| 0 | X | 1 | 0 | X | X | 0 | X | 3 | 3 | — |
| 0 | X | 1 | 1 | X | X | 0 | X | 3 | 3 | C |
| 0 | X | 0 | 1 | X | X | 1 | X | 3 | 4 | C |
| 0 | X | 1 | 0 | X | X | 1 | X | 3 | 4 | — |
| 0 | X | 1 | 1 | X | X | 1 | X | 3 | 4 | C |
| 0 | X | X | X | X | X | 0 | 1 | 3 | 1 | — |
| | | | | | T2 | | | | | |
| 1 | 0 | 0 | 0 | X | X | X | X | 4 | 1 | — |
| 1 | 0 | 0 | 1 | 0 | X | X | X | 4 | 4 | C |
| 1 | 0 | 0 | 1 | 1 | X | X | X | 4 | 4 | C,R |
| 1 | 0 | 1 | 0 | 0 | X | X | X | 4 | 4 | — |
| 1 | 0 | 1 | 0 | 1 | X | X | X | 4 | 4 | R |
| 1 | 0 | 1 | 1 | 0 | 0 | X | X | 4 | 4 | C |
| 1 | 0 | 1 | 1 | 0 | 1 | X | X | 4 | 4 | G |
| 1 | 0 | 1 | 1 | 1 | 0 | X | X | 4 | 4 | C,R |
| 1 | 0 | 1 | 1 | 1 | 1 | X | X | 4 | 4 | C,R |
| 1 | 1 | 0 | 0 | X | X | X | X | 4 | 1 | — |
| 1 | 1 | 0 | 1 | X | X | X | X | 4 | 4 | — |
| 1 | 1 | 1 | X | X | X | X | X | 4 | 4 | — |

The operation of the above telecommunication system is described hereinafter by considering only the above three substations SX, SY and SZ among the plurality of 8 or more such substations included therein. For the circuits included in the substations SX and SY the same reference numerals are used as for the circuits included in the station SZ shown in FIG. 3.

will not start a data transmission procedure.

Substation SZ

MBY: the own allocation status stored in this register is

000...0 indicating that no signalling channel has yet been seized or assigned to SZ.

DIR: this register includes at least one new data cell and no waiting data cell, so that the output signals of the gates GC3 and GC4 are activated (ND=1) and de-activated (WD=0) respectively. For this reason SZ will start a channel allocation procedure followed by a data transmission procedure.

Main station MS

The main station MS is supposed to be in the condition for which:

the contents of the allocation status register ASR are

110...0 indicating that the first and second signalling channels have been seized or allocated;

the contents of the request register REQ are zero indicating that no requests for signalling channel allocation or for data transmission have been sent to it by the substations.

As already mentioned above the various circuits of the main station MS are controlled by the clock signals provided by the clock recovery circuit CLR1, whilst those of the substations such as SZ are controlled by the clock signals generated by the clock recovery circuit CLR3. The clock control of the circuits is not shown in detail but follows from the description of their operation.

On the links DL, UL, DL1, UL1 the information is transmitted under the form of cells and in a bit serial way, but in the main station MS as well as in the substations these cells are processed under the form of bytes. The required series-to-parallel and parallel-to-series conversions are performed in the above converters SPC1 to SPC3 and PSC1 to PSC3 which will not be considered in detail further.

Because the request register REQ is empty its output RE is de-activated (0) so that also the output of gate G1 which constitutes the selection input SI1 of the multiplexer MUX1 is de-activated (0). As a consequence the output B of the allocation status register ASR is then coupled to the input C of the register REG3.

Each cell entering the main station MS on the incoming downstream link DL1 is fed via the converter SPC1 to register REG2. When the VCI of this cell is present in this register the detection circuit VD2 checks if this VCI is indicative of an empty cell or of a data cell. In the assumption that the cell is a data cell, as indicated by the output EMC of VD2 being de-activated (0), the output of the gate G2 constituting the selection input SI2 of the multiplexer MUX2 is also de-activated (0). As a consequence the output of register REG2 is connected to the input B of this multiplexer MUX2. The cell is then transferred from register REG2 into register REG3 and when the MAC field MF of this cell is present in this register the allocation status

110...0 is copied in it from the general allocation status register ASR. The cell thus obtained and which is represented in FIG. 5b is then converted in PSC1 and transmitted on the downstream link DL to all the substations and more particularly to SX, SY and SZ to inform them about the general allocation status of the signalling channels. Substations SX, SY, SZ In each of these substations the receipt of the MAC field MF

110...0 in the cell register REG4 has for effect that it is applied to the processing unit PU1 which operates as shown in FIG. 4. From this flow chart it follows that the processing unit PU1 more particularly copies the MAC field MF into the register MFR2 and checks if it contains a single bit 1 or not. Because, in the present case, the answer to this question is negative (N) PU1 resets the counter ASC and copies the general allocation status from MFR2 into the general allocation status register ALR. The contents of this register thus become:

110...0

To be noted that it is necessary to check if the MAC field contains a single bit 1 or more. Indeed, this MAC field may also be used to transmit a single grant bit 1—as will become clear later—so that only when the MAC field contains more than one bit 1 one is sure that an allocation status is concerned. On the contrary, when the MAC field contains a single bit 1 this may either be an allocation bit or a grant bit. To distinguish between these two cases use is made of the counter ASC, as will be explained later.

Following the above updating of the allocation status in each of the substations SX, SY, SZ the following operations are also performed therein:

Substation SX

Since the contents of register MFR2 are

110...0 the single bit detection circuit SBD detects the presence of more than one bit 1 therein and therefore generates a de-activated (0) output signal SB, i.e. SB=0. Because on the other hand the own allocation status stored in register MBY is

010...0 the comparator COMP1 detects the presence of the bit 1 of MBY in MFR2 and therefore activates its output MY, i.e. MY=1.

As already mentioned above the substation SX is in the active state 4 for which the input signals AC and SRO of the finite machine FSM are activated (1) and equal to 4 respectively. Because on the other hand DE=0, SB=0, MY=1 and ND=1 it follows from the third line of the above table T2 that FSM then provides activated check and transmission request signals C=1 and R=1 which are applied to the cell assembly circuit CAC. Therein the check signal C=1 gives rise to the creation of a check cell which is shown in FIG. 5c and wherein the information field is constituted by a series of bytes each equal to the own allocation status of SX stored in register MBY, i.e.

010...0 whilst the header contains a check VCI, i.e. VC.

It should be noted that the repitition of the bytes in the information field is done to have a sufficient number of transitions on the transmission link UL and to maintain the DC level thereon substantially contact.

On the other hand in the circuit CAC the request signal R produces the insertion in the MAC field MF of this cell of the own allocation status code

010...0 thus requesting the main station to allow the transmission of a data cell stored in the data cell input register DIR. The data cell for which the request is made is then shifted into part WD of the register DIR so that the output WD thereof becomes activated (1).

The substation SY transmits the check cell (FIG. 5c) generated on the folded upstream link UL via the converter PSC3 whose output is connected to UL via gating circuit GC7 (FIG. 1).

Substation SY

This station operates in a similar way as the station SX but since no new cell is available in the part ND of the register DIR, i.e. ND=0, only the check output signal C of the finite state machine FSM is activated, as follows from the second line of table T2. Therefore the check cell then generated is as shown in FIG. 5d, i.e. with an information field constituted by a series of bytes each equal to the own allocation status stored in the register MBY of SY:

100...0

The check VCI of this cell is equal to VC and its MAC field is equal to zero since no transmission request for a data cell is formulated therein.

The substation SY transmits this check cell (FIG. 5d) on the folded upstream link UL via the converter PSC3 and the gating circuit GC6 (FIG. 1).

Substation SZ

Since the contents of the register MFR2 are

110...0 the single bit detection circuit SBD detects the presence of more than one bit 1 and therefore generates a de-activated (0) output signal SB, i.e. SB=0. Because on the other hand the own allocation status stored in register MBY is

000...0 the comparator COMP1 does not detect the presence of a bit 1 of MBY in MFR2 and therefore de-activates its output MY, i.e. MY=0.

As already mentioned above the substation SZ is supposed to be in the passive state 1 for which the input signals AC and SRO of the finite state machine FSM are de-activated (0) and equal to 1 respectively. Because on the other hand ND=1 it follows from the second line of the above table T1 that FSM then brings the substation SZ in the new state SRN=2 and generates activated selection and request signals S=1 and R=1.

Under the control of the selection signal S=1 the processing unit PU2 performs a find-first-zero- function which comprises selecting a free bit 0, indicative of a free signalling channel, in the allocation status stored in the register ALR, making this bit equal to 1 to seize this channel and storing it in the register MBY. This means that the own allocation status of the latter register MBY becomes

001...0 indicating that the third signalling channel has been selected and seized by the station SZ.

The find-first-zero or find-first-one function is generally known in the art and is for instance mentioned in the Bell System Technical Journal, Volume XLIII, September 1964, Number 5, Part 1, pages 1869-1870.

On the other hand, because the request signal R is activated the cell assembly circuit CAC creates a cell, shown in FIG. 5e, wherein the MAC field MF is equal to

001...0 indicating that an allocation request for the seized third signalling channel is formulated to the main station MS, and wherein the information field is zero.

The substation SZ transmits this cell (FIG. 5e) on the folded upstream link UL via the converter SPC4.

Because the length of the paths connecting a substation to the input UL and output DL of the main station MS is substantially the same for each substation a constant due to the link UL being folded as shown, the processing time of each of these substations may be so regulated that the bits of the cell shown in FIG. 5e at the output of SZ may be OR-ed in GC6 with the corresponding bits of the cell represented in FIG. 5d at the output of SY and that the resultant bits may be OR-ed in GC7 with the corresponding bits of the cell shown in FIG. 5c at the output of SX. The resultant cell is the check cell shown in FIG. 5f and is transmitted to the main station MS.

Main station MS

When the last mentioned check cell shown in FIG. 5f is supplied to the station MS it is entered in the buffer BUF under the control of the clock provided by the clock recovery circuit CLR2 and read from this buffer under the control of the clock generated by the recovery circuit CLR1. After a series-to- parallel conversion in SPC2 it is transferred to MFD and REG1. The MAC field MF

011...0 is detected by the detection circuit MFD, and by the logic circuit LC1 this field is split up into a first code

010...0 indicating that a grant signal is given subsequent to the transmission request involving the second signalling channel, and into a second code

001...0 indicating that a grant signal is given subsequent to the allocation request involving the third signalling channel. Both these codes are successively stored in the request register REQ whose output RE thus becomes activated, i.e. RE=1.

The above MAC field MF detected by MFD is also written in the MAC field register MFR1 and the logic circuit LC2 OR-gates the contents of this register MFR1 with those of the allocation status register ASR and writes the result in the latter register. Because the previous contents of ASR were

110...0 and those of MFR1 are

011...0 the allocation status stored in ASR becomes:

111 . . . 0 indicating that channels 1, 2 and 3 have been seized or allocated.

As already mentioned above the above check cell (FIG. 5f) is also supplied to the register REG1 and from there to the link UL1 via the converter PSC2. As soon as the VCI of the cell is present in REG1 the VCI check circuit VD1 detects the presence of this cell and accordingly activates its output CC. The latter enables the gating circuit GC1 so that the information field 110 . . . 0, 110 . . . 0, etc.

of the check cell is applied to the filter IFF which selects one of these bytes and applies it to the check byte buffer register CBR. The above new contents

111 . . . 0 of ASR are then overwritten by the contents

110 . . . 0 of CBR so that the contents of ASR again become

110 . . . 0

ASR thus stores the present general allocation status. This is correct since the allocation of the third signalling channel to the substation has not yet been granted, i.e. SZ is still not active.

Because the output RE of the request register REQ is activated, i.e. RE=1, and assuming that the cell counter TC has not yet reached its final value, so that its output TCB is still activated (1), the output SI1 of the gate G1 is also activated. As a consequence the output A of the request register REQ is connected to the register REG3 via the multiplexer MUX1.

In a similar way as described above, when a data cell is of an incoming downstream on link DL1 enters the register REG2 of the main station MS if all the previously considered conditions are still true this data cell is transferred to the register REG3 via the multiplexer MUX2. Afterwards the first code stored in the request register REQ is entered in the MAC field MF of the data cell and the latter, shown in FIG. 5g, is then transmitted on the downstream link UL to all the substations such as SX, SY and SZ which are now considered in succession.

Substation SX

When the last mentioned data cell (FIG. 5g) is received in the active substation SX it is transmitted to the register DX via the register DOR and also to the register REG4. The code

010 . . . 0 is then stored in the register ALR under the control of the processing unit PU1. As a consequence the circuit SBD provides an activated output signal SB=1, and since the contents of the register MBY are

010 . . . 0 also the output MY of the register is activated, i.e. MY=1.

From the seventh line of the above table T2 it then follows since AC=1, DE=0, SB=1, MY=1, ND=0, WD=1 and SRO=4 that the output G (grant) of the FSM is activated. This has for effect that the waiting data cell in the part WD of the register DIR is transmitted to the main station MS under the control of the cell assembly circuit CAC and via PSC3.

From the above it follows that to transmit a data cell the substation SX has to request the main station MS to use the allocated (second) signalling channel via a first cells and that it is only able to perform such a transmission after having received a grant signal from MS in this signalling channel of a second cell.

Substation SY

When the above mentioned data cell (FIG. 5g) is received in the active substation SY it is processed in a similar way as in the substation SX. However, in this case SB=1 and MY=0 so that with AC=1, DE=0, ND=0 the FSM takes no action.

Substation SZ

As already mentioned above this station is in the passive state 2 so that the signals AC=0 and SRO=2. Because also SB=0 and MY=0, it follows from the third line of table T1 that FSM performs no action.

Main station MS

After the main station MS has processed the data cell transmitted to it by the substation SZ it transmits the cell shown in FIG. 5h and containing the above mentioned second code to all the substations such as SX, SY, SZ which are considered hereinafter:

Substation SY

This station performs no action for the same reasons as described above in relation to the receipt of the cell of FIG. 5g by SY.

Substation SY

This station performs no action.

Substation SZ

Since the MAC field MF of the cell received in MFR2 is

001 . . . 0 and the own allocation status of the register MBY is also equal to

001 . . . 0 the output signals SB of SBD and MY of MBY are both activated (1), i.e. SB=1 and MY=1. Because on the other hand the station SZ is in the state 2, for which the output signals AC and SRO are de-activated (0) and equal to 2 respectively, it follows from the sixth line of table T1 that the FSM then brings the substation in the state 3 and generates an activated echo signal E=1. As a consequence the cell assembly circuit CAC generates an echo cell shown in FIG. 5l and transmits it to the main station MS. The information field of this cell is constituted by the own address OA of the substation SZ, this address OA being memorized in the register OAR. The header of this echo cell contains an echo VCI, i.e. VE, whilst its MAC field MF may contain request for data transmission. However, because it is assumed that no new data cell is to be transmitted (ND=0) the MAC field is zero.

Main station MS

When the above echo cell (FIG. 5i) is received in the main station MS the MAC field MF is detected by the circuit MFD but because this field is zero nothing is written in the request register REQ and the contents of ASR are not changed. The echo cell itself is also applied to the register REG1 where the VCI check circuit VD1 detects the presence of this cell and therefore activates its output EC. The latter output signal EC enables the gating circuit GC2 thus allowing the echo cell to be stored in the echo cell register ECR. As a consequence the output EP of ECR is then activated.

When the VCI of an empty cell on the incoming link DL1 is entered in the cell register REG2 and is detected by the VCI detection circuit VD2 the latter activates its output signal EMC. Because also the output EP of the register ECR is activated the output SI2 of gate G2 is activated, thus connecting the output A of ECR to the output C of the multiplexer MUX2. The echo cell is then transferred to the register REG3 and because the selection input SI1 of the multiplexer MUX1 is de-activated the allocation status ASR

110 ... 0 is stored in the MAC field of the echo cell. The thus modified or return echo cell is then transmitted on the downstream link DL to all the substations SX, SY and SZ which are again considered in succession:

Substation SX

The return echo cell is entered in the register REG4 of active substation SX as a consequence of which the processing unit PU1 analyses the MAC field MF and updates the general allocation status register whose contents remains equal to

110 ... 0

This has for effect that SB=0. On the other hand the VCI detection circuit VD3 checks if the VCI, in REG4 is that of an echo cell or not and because the cell is an echo cell it activates its output EO. As a consequence the gating circuit GC5 is enabled and via this circuit the information field IF of the echo cell is transferred into the echo cell register EOR. The information field which constitutes the own address of the substation SX is then compared by the comparator COMP2 with the own address OA stored in the register OAR. Because these addresses are different the output signal CO of the comparator COMP2 is de-activated (0). Since AC=1, SRO=4, SB=0, MY=1 and ND=0 it follows from the second line of the above table T2 that SX remains in the active state 4 and that the output signal C of the FSM is activated. As a consequence the cell assembly circuit CAC will transmit a check cell to the main station MS, e.g. the one shown in FIG. 5j.

Substation SY

This substation reacts in a similar way as SX to the receipt of the echo return cell and also transmits a check cell to the main station, e.g. the one shown in FIG. 5k.

Substation SZ

Because this station was responsible for the transmission of the echo cell to the main station MS the comparator COMP2 detects the presence of the own address in the echo return cell and therefore activates its output signal CO. Because AC=0, SB=0, MY=1 and CO=1 it follows from line 11 of the above table T1 that the station SZ is brought from passive state 3 into active state 4 and that the FSM activates its output C. This gives rise to the transmission of a check cell by the substation SZ, e.g. the one represented in FIG. 5l.

The above check cells of FIGS. 5j, 5k and 5l are OR-ed and the resultant check cell shown in FIG. 5m is transmitted to the main station MS where this leads to writing in the register ASR, via REG1, GC1, IFF and CBR, the status

111 ... 0

Thus the third channel is definitively allocated to the substation SZ. Also the MAC field is written in the request register RE via MFD and LC1. This will lead to the transmission to the substations of a grant signal which will be recognized by SZ, etc.

From the above it follows that the MAC field of the cells is used:

by each substation to request the main station for signalling channel allocation or for data transmission;

by the main station MS to communicate to all the substations the general allocation status of all the 8 signalling channels as well as to send a single grant signal following the request for signalling channel allocation or for data transmission by a substation;

The function of the counters ASC, DEC and ECR which have not be considered above is as follows:

Counter ASC

The purpose of the program visualised in FIG. 4 is to store the general allocation status in the register ALR. If the filed MF of a cell received in registers REG4 and MF2 contains more than one bit 1 this field certainly is the general allocation status and for this reason the status is then copied from MFR2 into ALR after having reset the counter ASC. On the contrary, if this field MF contains a single bit 1 this bit is either a grant bit or the filed is a general allocation status with one active station. Only in the latter case the filed MF has to be copied in ALR.

Due to the presence of the counter TC (FIG. 2) one is sure that the general allocation status is transmitted at least once per time interval TC from the main station to the substation so that during a time interval TC1 larger than TC the general allocation status will be received at least once. This is the reason why one uses a counter ASC which is stepped each time a single bit is detected. When one bit is received a number of times equal to TC1 in succession it is concluded therefrom that a check request was among them and that the bit indicated the only signalling channel in use at the moment so that this bit determines the present allocation status. As a consequence the MAC field is then copied into the general allocation status register ALR.

Counter DEC

When the part ND of the data input register DIR does not receive new cells so that its output RS remains de-activated the counter DEC is not reset and is stepped under the control of the cell clock CCL3. When the situation lasts for a predetermined time interval the counter DEC will therefore reach a predetermined value for which its output DE becomes de-activated. As a consequence the signalling channel assigned to the substation will then be de-allocated. Indeed, from the above table T2 it then follows that the substation upon receiving the allocation status from the main station will not respond to the main station by means of a check cell and will return to the passive state 1.

Counter ECC

Finally, the counter ECC is started upon the transmission of an echo cell by the substation, is stepped under the control of the cell clock signal CCL3 and is reset upon the receipt of a correct return echo cell. Hence, when such a correct return echo cell is not received within a predetermined time interval after the transmission of the echo cell the counter ECC will reach a predetermined value wherein its output ETC is de-activated. From the above table T2 it follows that in this case the state of the substation is changed from state 3 to state 1.

Instead of using in the first and second cells, on the respective upstream and downstream links, a same number of signalling channels and to allocate to a same substation homologous signalling channels on these links it would be possible to use in the cells on the downstream link another number of signalling channels than in the cells on the upstream link. However, by using the same number of signalling channels in both cases, no additional allocation means are required for the signalling channels on the downstream link and the transmission of the general allocation status in these channels is easy.

In the above the processor PU of each substation searches for the first free 0, e.g. the leftmost free 0, in the general allocation status stored in its register ALR. The substations thus all have a same priority since any one of them may seize any of the channels. But it is possible to give these substations a predetermined priority e.g. by allowing them to search for a free (leftmost) 0 only in predetermined portions of ALR, the leftmost positions corresponding to the highest priorities.

While the principles of the invention have been described above in connection with specific apparatus, it is to be clearly understood that this description is made only by way of example and not as a limitation on the scope of the invention.

We claim:

1. A communication system comprising
   a main station,
   a plurality of substations connected in parallel to a first path on which recurrent first cells are conveyed from the substations to the main station and to a second path on which recurrent second cells are conveyed from the main station to the substations, each of said first and second cells including a plurality of signalling channels smaller than the number of substations and a data channel each of said substations further comprising
   a substation transmitter to write information into said first cells including the writing of signalling channel allocation request signals in corresponding signalling channels, and
   a substation receiver to read information from said second cells, including an indication of which of said signalling channels of said first cells are currently free,
   a main station receiver to read information from said first cells, including said signalling channel allocation request signals,
   a main station transmitter to write information into said second cells, including said indication of which of said signalling channels of said first cells are currently free, and for broadcasting said second cells to all said substations,
   allocation means in said main station and in each of said substations, for resolving conflicting signalling channel allocating requests and for allocating a free one of said plurality of signalling channels of said first cells to a substation having data to transmit,
   request signal transmission means in each substation having, one of said signalling channels of said first cells allocated to said each substation, for transmitting to said main station a data transmission request signal in said one allocated signalling channel of one of said first cells, and
   grant signal means in said main station for transmitting a data transmission grant signal to the requesting substation in a signalling channel of one of said second cells in response to the receipt of said data transmission request signal.

2. A communication system according to claim 1, wherein
   said first and second cells each include a same number of signalling channels, and
   the signalling channel of said second cell corresponding to the allocated signalling channel of said first cell is used by said main station to transmit said grant signal.

3. A communication system according to claim 1, wherein each signalling channel is constituted by a single bit position in a signalling field.

4. A communication system according to claim 1, wherein each of said substations further comprises deallocation means to deallocate a previously allocated signalling channel when a predetermined time interval has elapsed since the last receipt of new data to be transmitted.

5. A communication system according to claim 1, wherein said first path is folded and includes a first portion connected to said substations and a second portion connected to said main station in such a way that the length of the connection from the main station through any substation and back to the main station is substantially a constant.

6. A communication system comprising:
   a main station;
   a plurality of substations intercoupled by a first path on which recurrent first cells are conveyed from the substations to the main station and by a second path on which recurrent second cells are conveyed from the main station to the substations, each of said first and second cells including a plurality of signalling channels smaller than the number of substations and a data channel, each of said substations further comprising
   a substation transmitter to write information into said first cells each including a plurality of signalling channels; and
   a substation receiver to read information from said second cells;
   a main station receiver to read information from said first cells;
   a main station transmitter to write information into said second cells including an indication of which of said signalling channels of said first cells are currently free, and for broadcasting said second cells to all said substations;
   allocation means in said main station and in each of said substations, for allocating a free one of said plurality of signalling channels of said first cells to a particular substation having new data to be transmitted towards said main station, said allocation means further comprising means in said particular substation for provisionally selecting a free signalling channel in a substation allocation register storing general allocation status information of all the signalling channels, for deriving an own allocation status information from the general allocation status information by marking the selected free channel as busy and for storing the own allocation status information in a byte register;

means in said particular substation for writing a signalling channel allocation request signal in the selected signalling channel of a first cell transmitted towards said main station;

means in said main station for transmitting an allocation grant signal in the selected signalling channel of a second cell being transmitted to all said substations;

means in said particular substation for writing an own address from an own address register of said particular substation into the data channel of an echo first cell being transmitted towards said main station;

means in said main station for recognizing a received echo cell and to transmit a return echo second cell corresponding to the received echo cell to all said substations; and means in each of said substations for comparing the address stored in said own address register with the address of said return echo second cell, the provisionally selected signalling channel being definitively allocated to said each substation if and only if the comparison is successful;

request signal transmission means in each substation having one of said signalling channels of said first cells allocated to said each substation, for transmitting to said main station a data transmission request signal in said one signalling channel of one of said first cells; and data transmission grant signal means in said main station for transmitting a data transmission grant signal to the requesting substation in a signalling channel of one of said second cells in response to the receipt of said data transmission request signal.

7. A communication system according to claim 6, wherein each of said substations further comprises a finite state machine controlling the execution of said allocation procedure, said machine having a first passive state and being brought into:

a second passive state when said substation has said new data to be transmitted and wherein said substation performs said selection of a free signalling channel and transmits said allocation request signal to said main station;

a third passive state when said substation receives said allocation grant signal and wherein said substation transmits said echo first cell; and an active state when said substation receives said return echo second cell and said comparison is successful, a substation in the active state being allowed to transmit said data in a data channel subsequent to the transmission of a said transmission request signal and the receipt of a transmission grant signal.

8. A communication system according to claim 6, wherein said main station further comprises:

a main station allocation register for storing said general allocation status information, and means for transmitting said general allocation status information to all said substations in the signalling channels of a second cell then storing said general allocation status information in the substation allocation register of each of the substations.

9. A communication system according to claim 8, wherein said main station further comprises a first logic circuit which when the signalling channels of a received first cell contain more than one allocation or transmission request signal, provides individual grant signals and successively stores said individual grant signals in a filling level register for successive transmission to said substations in the allocated signalling channels of a second cell.

10. A communication system according to claim 9, wherein said main station transmits said general allocation status information stored in said main station allocation register to said substations when said filling level register is empty.

11. A communication system according to claim 9 wherein said main station transmits said general allocation status information stored in said main station allocation register when a predetermined time interval counted by a timing counter has elapsed since the previous transmission of said general allocation status information.

12. A communication system according to claim 8, wherein each of said substations transmits its said own allocation status information to said main station in the data channel of a check first cell, and said main station uses a resultant check cell obtained by OR-ing the individual check cells transmitted by said substations, to update the general allocation status information stored in its said main station allocation register.

13. A communication system according to claim 12, wherein said check first cell contains a plurality of data words each constituted by said own allocation status information.

14. A communication system according to claim 12, wherein each of said substations further comprises deallocation means to deallocate a previously allocated signalling channel when a predetermined time interval has elapsed since the last receipt of new data to be transmitted, and said predetermined time interval is counted by a deallocation counter whose respective activated output signal prevents that particular substation from transmitting to said main station a check first cell containing said particular substation's own allocation status information.

15. A communication system according to claim 6, wherein each of said substations further comprises means for checking if one or more of the signalling channels of a received second cell is or are busy and in case a single busy signalling channel is detected for incrementing an allocation status counter which is reset and the status of the signalling channels of said received cell is copied in said substation allocation register after the allocation status counter has counted a predetermined value or when more than one busy signalling channel is detected.

16. A communication system according to claim 14, wherein each of said substations further comprises an access register with a first part to store new data to be transmitted and for which no request signal for data transmission has been transmitted to said main station and a second part to store the data for which such a request signal has been transmitted, said deallocation counter being associated with said first part.

17. A communication system according to claim 6, wherein said main station writes said echo return second cell in an empty second cell.

18. A communication system according to claim 10, wherein said main station transmits said general allocation status information stored in said main station allocation register when a predetermined time interval counted by a timing counter has elapsed since the previous transmission of said general allocation status information, and said main station further comprises a first multiplexer having a first data input coupled to an output of said filling level register, a second data input coupled to an output of said main station allocation register, a selection input coupled to the output of a first gating circuit which is controlled by the output of said filling level register and by an output of said timing counter, and an output coupled to said second path via an access register.

19. A communication system according to claim 9 wherein said main station further comprises a signalling channel detection circuit which couples said first path to a data input of said filling level register via said first logic circuit as well as to said main station allocation register via a second logic circuit which is able to OR-gate the contents of said main station allocation register with those of said signalling channels and store the result in said main station allocation register.

20. A communication system according to claim 12, wherein said main station further comprises an echo cell and check cell first detection circuit to which said first path is coupled and which enables a second gating circuit and a third gating circuit when said resultant check cell and an echo cell is detected by said first detection circuit respectively.

21. A communication system according to claim 20, wherein the enabled second gating circuit allows an associated circuit to overwrite the status of the signalling channels stored in said main station allocation register.

22. A communication system according to claim 20, wherein said main station writes said echo return second cell in an empty second cell, and the enabled third gating circuit allows said echo cell to be applied to a first data input of an active/not active multiplexer through an echo cell register, said active/not active multiplexer having a second data input coupled to said second path, a selection input which is controlled by the output of a fourth gating circuit providing a respective activated output signal when simultaneously an empty cell is detected on said second path by a second detection circuit and an echo cell is present in said echo cell register, the output of said active/not active multiplexer being coupled to said second path.

23. A communication system according to claim 6, wherein said substation further comprises a check counter to count the time elapsed since the transmission of an echo cell and providing a respective activated output signal when no echo cell is received, the signalling channel allocation being then inhibited by said allocation means.

* * * * *